United States Patent [19]

Kim

[11] Patent Number: 5,511,136
[45] Date of Patent: Apr. 23, 1996

[54] METHOD FOR DETECTING CLASS ERRORS IN A TRANSMITTED IMAGE SIGNAL ENCODED BY CLASSIFIED VECTOR QUANTIZATION

[75] Inventor: Jong-Rak Kim, Seoul, Rep. of Korea

[73] Assignee: Daewoo Electronics Co., Ltd., Seoul, Rep. of Korea

[21] Appl. No.: 297,992

[22] Filed: Aug. 30, 1994

[30] Foreign Application Priority Data

Aug. 31, 1993 [KR] Rep. of Korea ............... 1993-17190

[51] Int. Cl.[6] .................. G06K 9/40; G06K 9/48; G06K 9/62
[52] U.S. Cl. .................. 382/275; 382/199; 382/224
[58] Field of Search .................. 341/94, 106; 371/30; 358/467; 382/54, 36, 173, 197, 232, 309, 254, 224, 275, 199, 200, 224, 9, 21, 56, 57; 348/417, 418, 422, 420, 421, 699

[56] References Cited

U.S. PATENT DOCUMENTS 5,365,604  11/1994  Kwok et al. .................. 382/54

Primary Examiner—Joseph Mancuso
Assistant Examiner—Peter Park
Attorney, Agent, or Firm—Anderson Kill Olick & Oshinsky

[57] ABSTRACT

A novel method for detecting class errors in the image signal which has been transmitted in a compressed form by using a classified vector quantization technique comprises the steps of selecting reference blocks out of neighboring blocks of the current block; calculating an error detecting function using the class name for the current block and the reference blocks; and determining the error for the current block by comparing the calculated error detecting function with a predetermined threshold.

2 Claims, 6 Drawing Sheets

FIG.4A

| BLOCK 1 | BLOCK 2 | BLOCK 3 |
|---------|---------|---------|
| BLOCK 4 | BLOCK 0 | BLOCK 5 |
| BLOCK 6 | BLOCK 7 | BLOCK 8 |

METHOD FOR DETECTING CLASS ERRORS IN A TRANSMITTED IMAGE SIGNAL ENCODED BY CLASSIFIED VECTOR QUANTIZATION

FIELD OF THE INVENTION

The present invention relates to a method for decoding an image signal; and, more particularly, to a method for detecting class errors present in a transmitted image signal compressed by using a classified vector quantization method.

DESCRIPTION OF THE PRIOR ART

In digital image processing systems such as video telephone and high definition television, various data compression techniques are used to reduce a large volume of digital data defining each frame of image signals. Vector quantization is one of such compression techniques that has been found to be efficient for image compression in recent years.

Vector quantization is a technique for quantizing an input image signal in units of blocks. The input image signal is divided into blocks of N unit signals; and each block is represented by an N-dimensional input vector. Thereafter, each input vector is mapped into one of a set of predetermined candidate vectors constituting a codebook.

An input vector is represented by a representative vector which is one of the candidate vectors in the codebook. Specifically, each input vector is individually quantized or mapped into a most similar candidate vector so as to minimize a mapping distortion, i.e., quantization error.

Compression is achieved by using an index for each candidate vector, i.e., a codeword index, instead of the vector itself, for the purpose of economizing the transmission and storage burdens. The codeword index may be further compressed by using, e.g., a variable length coding (VLC) method.

The basic principles for the vector quantization method and various methods for generating a codebook are described in, e.g., "Vector Quantization and Signal Compression" by A. Gersho and R. M. Gray, Kluwer Academic Publishers, 1991.

The number of candidate vectors in a codebook and the codebook contents are largely dependent on the statistical characteristics of the input vectors. In case that the input vectors have a wide variety, the number of candidate vectors in the codebook becomes very large. In terms of the coding efficiency, a smaller codebook obviously yields a better performance provided the error generated in the quantization process remains the same. In general, however, if a smaller sized codebook is used, the peripheral areas of an image may not be reproduced satisfactorily, thereby deteriorating the quality of the decoded image.

This problem can be solved by using a classified vector quantization method wherein each input vector is categorized into one of several classes, each class being defined by a specific pattern, e.g., an edge pattern of a block, and represented by a separate codebook.

In the classified vector quantization method, a plurality of smaller codebooks instead of a large one is used, wherein each codebook is adapted to represent a class of input vectors having similar characteristics. In an image encoding system employing the classified vector quantization method, an input vector is first classified into one of a plurality of classes and a corresponding codebook is determined; a representative vector, i.e., a candidate vector which best matches the input vector is selected from the codebook; and a class name representing the class for the input vector and the codeword index of the representative vector are coded by using, e.g., VLC for the transmission thereof.

FIG. 1 shows a block diagram of a conventional image encoding system employing the classified vector quantization method described above. In relation to the vector quantization method, a classification scheme for classifying input vectors into a plurality of classes and a plurality of codebooks, each of the class corresponding to each of the codebooks, is determined by considering the system characteristics, e.g., the input image statistics and the targeted compression ratio of the encoding system.

As shown in FIG. 1, an input signal is first fed to a vector formatter 10 wherein a frame of the image is divided into a multiplicity of blocks of a predetermined size, e.g., 4×4, thereby providing each block as an input vector for the classified vector quantization to be carried out thereafter. The input vector is coupled to a quantization circuit 30, and to a vector classifier 20 in which the input vector is categorized into one of a plurality of classes. In a conventional classified vector quantization method, an edge pattern is assigned to each class and each input vector is compared with each edge pattern to determine a most similar pattern. The class with the most similar pattern is determined as the class for the input vector.

The class information, i.e., the class name, determined at the vector classifier 20 is fed to the vector quantization circuit 30 and to a transmitter 40. The vector quantization circuit 30 contains a plurality of codebooks, each of which includes a various number of candidate vectors and corresponding codeword indices, thereby performing the quantization operation on an input vector using a different codebook chosen according to the class name of the input vector.

Specifically, one of the codebooks is selected in response to the class information and then the input vector is quantized to a closest candidate vector selected from the codebook. Usually, the codebook is in the form of a lookup table and the quantization process is implemented as a table lookup operation. Normally, instead of the representative vector, a codeword index is used to represent the input vector. The codeword index can be constituted with a smaller number of bits than the input vector. The codeword index and the class information for a current input vector are fed to the transmitter 40 for further processing, e.g., variable length coding, and for the transmission thereof.

In a decoding system which corresponds to the encoding system described above, the input vector is recovered easily from the class name and the codeword index by using a reverse process referencing a lookup table.

However, channel errors are apt to occur during the transmission process. Among the channel errors incurred, class errors in the transmitted signal encoded by employing the classified vector quantization method may impose detrimental effects on the quality of the reconstructed image in the decoding system.

Although various redundancy coding methods, e.g., Reed-Solomon code, are employed to detect and correct the channel errors, such prior art methods remain unsatisfactory as they fail to take into account the characteristics of the classified vector quantization method. Accordingly, needs have continued to exist for an efficient method of detecting or screening class errors present in a transmitted image signal so that they may be effectively concealed or rectified.

SUMMARY OF THE INVENTION

It is, therefore, a primary object of the present invention to provide an improved method for detecting class errors in an image signal which has been transmitted in a compressed form by using a classified vector quantization method.

In accordance with the present invention, there is provided a method for detecting an error in the class name of a current block for use in an image decoding system for decoding an image signal encoded by using a classified vector quantization method and transmitted through a channel, wherein the image signal is divided into a multiplicity of blocks, each of said blocks being classified into one of a plurality of classes based on the edge pattern of said each block, each of said classes being given a class name, and the transmitted class name for the current block belonging to an edged class having an edge therein, said method comprising the steps of:

selecting reference blocks out of neighboring blocks for the current block based on the transmitted class name of the current block;

calculating an error detecting function based on the transmitted class name for the current block and the class names of the reference blocks; and determining the class error for the current block by comparing the calculated error detecting function with a predetermined threshold.

BRIEF DESCRIPTION OF THE DRAWINGS

The above and other objects and features of the present invention will become apparent from the following description of preferred embodiments given in conjunction with the accompanying drawings, in which:

FIGS. 4A and 4B offer schematic representations of the current block and its neighboring blocks of an image signal.

DETAILED DESCRIPTION OF THE PREFERRED EMBODIMENTS

As stated previously, a classified vector quantization method utilizes a classification scheme wherein input vectors are classified into a plurality of classes and a plurality of codebooks, each of which corresponds to each of the classes.

Figure 2:
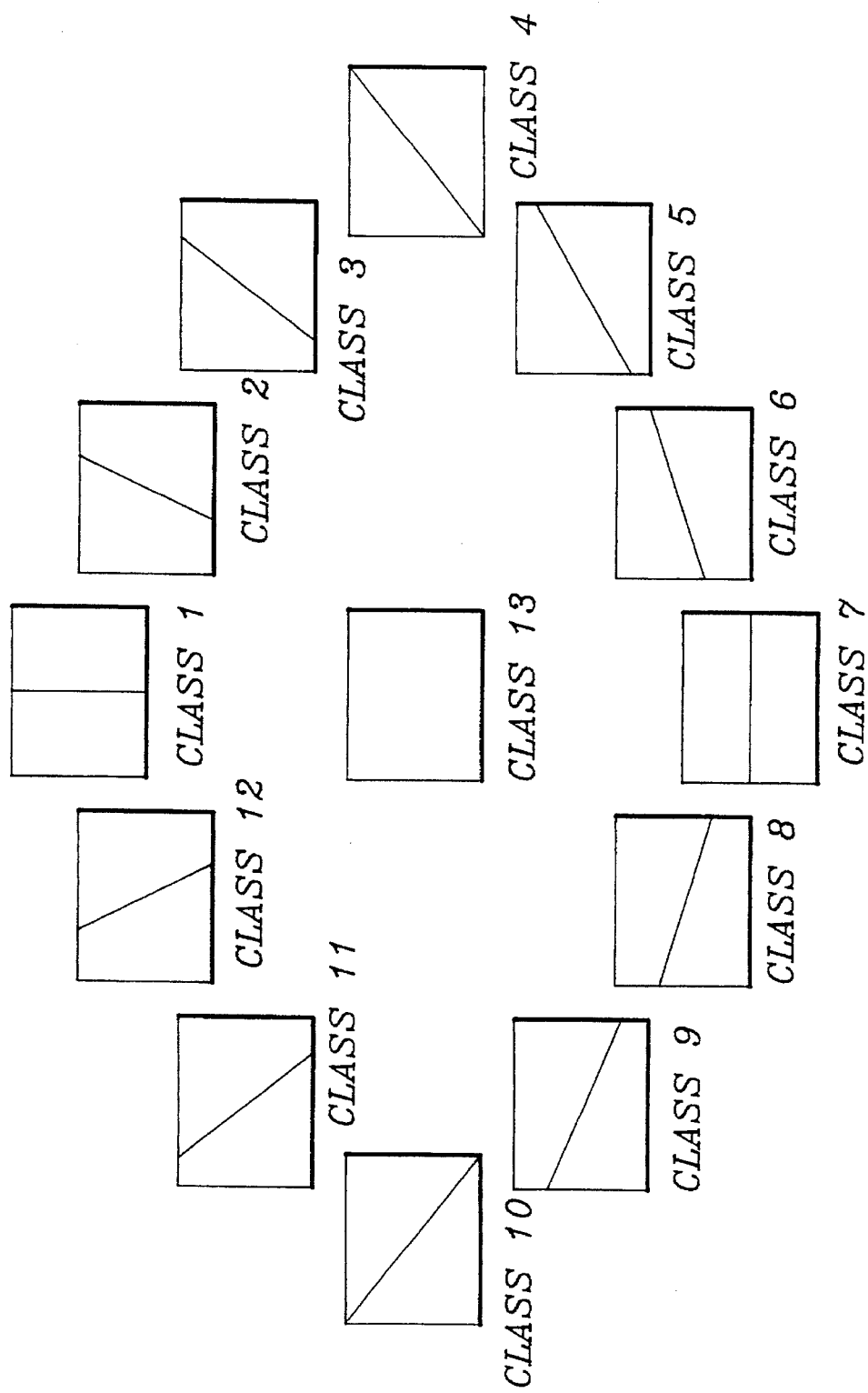
FIG. 2 illustrates edge patterns for input blocks, each of which represents a different class.

Referring now to FIG. 2, illustrative edge patterns of the input blocks are presented. Each pattern represents a different class or codebook in the classified vector quantization method in accordance with the present invention. Each square box with a line in it denotes a pattern of image blocks, wherein the line represents an edge. In other words, input image blocks are classified by the shape and the position of an edge located therein. Classes 1 through 12 shown in FIG. 2 are edged classes and the input blocks having no edge are classified as class 13.

Specifically, an input block which has a vertical edge in the center is classified as class 1, an input block which has a slanted vertical edge is classified as class 2, 3, 11 or 12, and so on.

To determine the class for an input vector, therefore, an edge in the input vector need be first detected. Once the edge in each input block is detected, the classification can be readily made by using, e.g., a pattern matching method for choosing a most similar edge pattern with the edge for the input block.

Various classification schemes other than the one depicted herein may be practiced provided that the input vectors included in a same class have similar characteristics.

As mentioned above, a codebook is assigned for each class, wherein the codebook includes a various number of candidate vectors representing the input vectors which are classified together. Each codebook may also include the codeword indices, each of which representing one of the candidate vectors.

Figure 1:
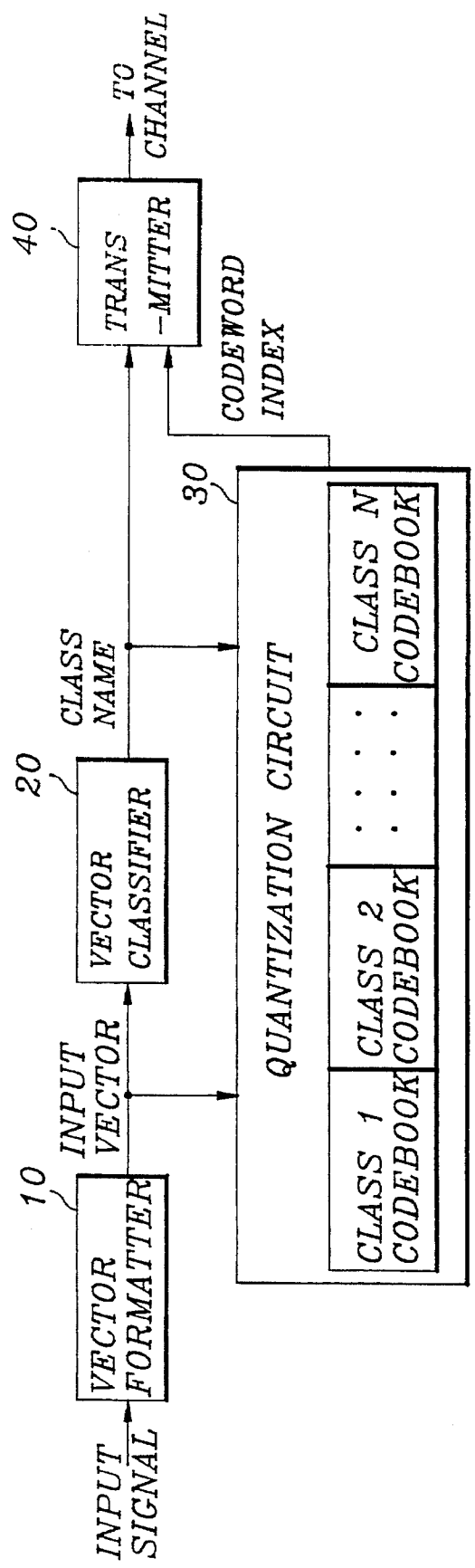
FIG. 1 is a block diagram of a prior art image encoding system that employs a classified vector quantization method.
Figure 3:
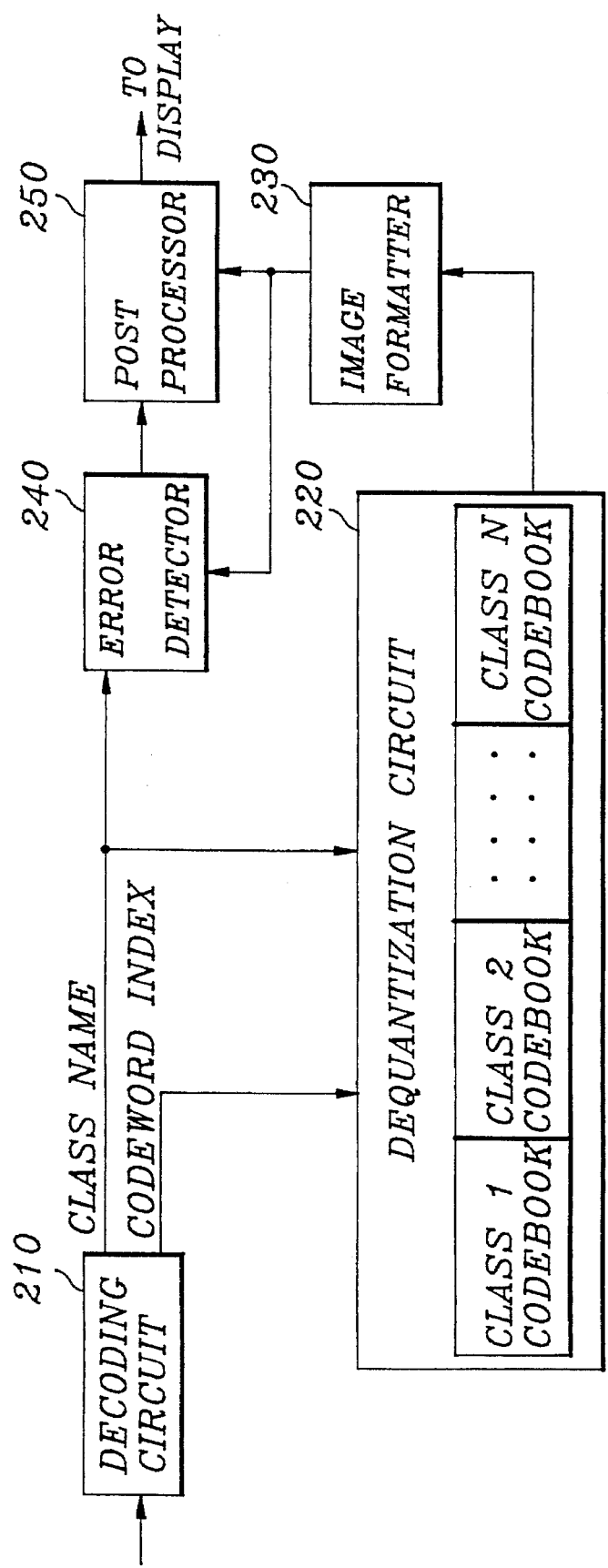
FIG. 3 represents a block diagram of an image decoding system for decoding a classified-vector-quantized image signal.

With reference to FIG. 3, there is shown a block diagram of an image decoding system for decoding an image signal transmitted from, e.g., the image encoding system shown in FIG. 1 through a transmission channel.

A transmitted image signal is fed to a decoding circuit 210 wherein the signal is decoded into class information or names and codeword indices. A class name and a corresponding codeword index for a current block to be decoded are coupled to a dequantization circuit 220. The dequantization circuit 220 includes a plurality of codebooks which match the codebooks used in the encoding process. At the dequantization circuit 220, a representative vector is retrieved in response to the codeword index from the codebook selected in response to the class information, and provided to an image formatter 230.

At the image formatter 230, a multiplicity of the representative vectors, i.e., reconstructed blocks of pixel values are rearranged to form an image frame and are provided to a post processor 250 wherein the image signal is processed by various known image enhancing techniques for yielding a better image quality (see, e.g., U.S. Pat. No. 5,247,363 issued to H. Sun et al.). The formatted image signal is also fed to the error detector 240 to be used in the inventive error detecting process.

The class information from the decoding circuit 210 is also fed to an error detector 240. The error detector 240 determines for each block or input vector whether the class information is correct or not. The class error of a current block is determined considering the class information and pixel values of the neighboring blocks by the methods described hereinafter in conjunction with FIGS. 4A, 4B and 5.

The detected class error information is fed to the post processor 250, wherein the error information can be advantageously used with any one of the known error concealment methods to correct errors of the image signal, thereby improving the quality of the image.

Figure 4B:
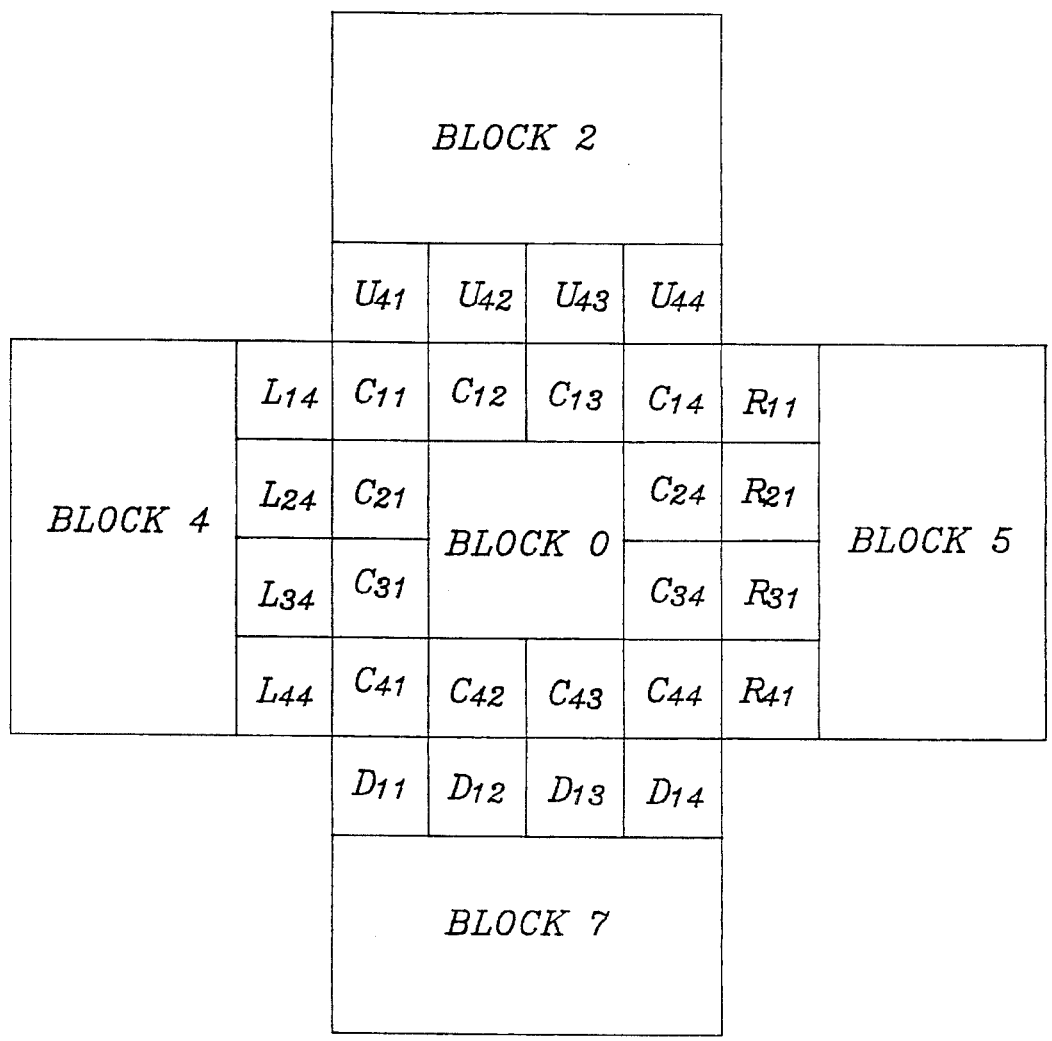
Figure 5:
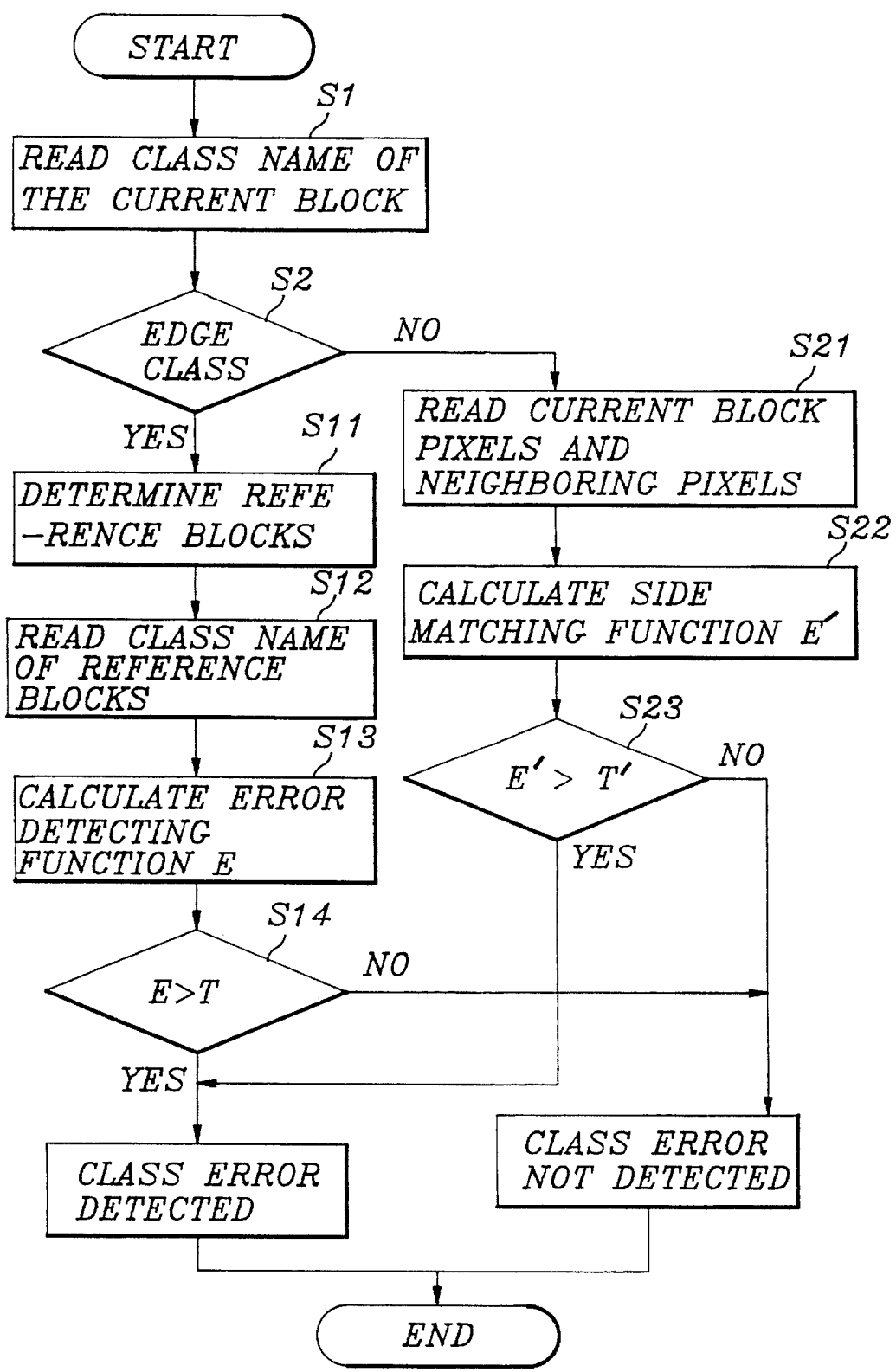
FIG. 5 presents a flow chart explaining the error detecting method of the present invention.

In FIG. 4A, a current block to be examined, i.e., block 0, and its neighboring 8 blocks are presented. The boundary pixels in the current block and the neighboring pixels to the current block, i.e., the boundary pixels in the neighboring blocks 2,4,5,7 which are located along the borderlines of the current block, are also presented and named in FIG. 4B. For the purpose of illustration, the size of each block, which is the unit of quantization, is assumed to be 4×4. As shown in FIG. 4B, the pixels in the current block are named as $C_{i,j}$, wherein i,j denote the horizontal and vertical positions of the pixel in the block, respectively. Similarly, the pixels in the blocks 2,4,5, and 7 are labeled as $U_{ij}$, $L_{ij}$, $R_{ij}$, and $D_{ij}$, respectively. Those named pixels indicated in FIG. 4B are the boundary and neighboring pixels for the current block.

To detect a class error for the block 0, a number of reference blocks, which are to be used in detecting the class error for the current block, are selected from the 8 neighboring blocks. The selection scheme is determined according to the transmitted class information of the block 0.

As an edge or other features of an image block tend to extend to its neighboring blocks, the reference blocks are selected from the eight neighboring blocks in accordance with the edge pattern of the current block, i.e., block 0. One exemplary scheme of selecting the reference blocks is shown in Table 1.

TABLE 1

Selection of Reference Blocks

| BLOCK 0 CLASS NAME | REFERENCE BLOCKS |
| --- | --- |
| 1 | 2,7 |
| 2,3,4,5,6 | 2,3,4,5,6,7 |
| 7 | 4,5 |
| 8,9,10,11,12 | 1,2,4,5,7,8 |
| 13 | 2,4,5,7 |

The first column in Table 1 contains the class names for the current block; and each row in the second column represents the blocks which will be selected as the reference block for the current block belonging to one of the classes in the same row in the first column.

Specifically, in case that the class name for the current block, i.e., block 0 is 1, blocks 2 and 7, i.e., an upper and a lower blocks to the current block, are used in detecting the class name error for the current block. As can be seen from the shape of each edge represented with one line in FIG. 2, the neighboring blocks which located in the direction of the edge of the current block is determined as the reference blocks because such blocks may be considered to have more information in relation to the edge of the current block than the other neighboring blocks.

The error detecting schemes are divided by the class for the current block. If the current block belongs to the edged classes, i.e., classes 1 through 12, an error detecting function is calculated by using the class name for the current block and the class data from the neighboring reference blocks. In case the current block is not an edged class, i.e., class 13 in this illustration, a side-matching method is used in detecting the error.

For the current block 0 whose transmitted class is one of the edged classes, the error detecting function f may be defined as:

$$f = \sum_{i \in S} d(c(i),c(0)) \qquad \text{Eq. (1)}$$

wherein S denotes a set of the reference blocks for the current block as illustrated by Table 1; c(i) denotes the class name of block i. The class difference function d(m,n) represents the degree of similarity or difference between classes m and n, and can be predetermined experimentally for all possible combinations of m and n. Specifically, if the classes m and n represent similar input vectors, e.g., classes 1 and 2 in FIG. 2, the value of d(1,2) will be small. It can be easily deduced that d(1,3) is larger than d(1,2) and d(1,3) is also larger than d(1,12) wherein the pair of numbers in the parentheses denotes the class names as shown in FIG. 2. If the error detecting function exceeds a predetermined threshold, the class name for the current block 0 is determined as incorrect.

As stated previously, if the current block 0 belongs to a non-edged class, i.e., class 13, a side-matching function f is used in detecting the class error, as follows:

$$f = \sum_{j=1}^{4} \{(C_{1j} - U_{4j})^2 + (C_{j1} - L_{j4})^2 + (C_{j4} - R_{j1})^2 + (C_{4j} - D_{1j})^2\} \qquad \text{Eq. (2)}$$

wherein $C_{ij}$ denotes the value of a boundary pixel in the current block and $U_{ij}$, $L_{ij}$, $R_{ij}$, $D_{ij}$ denote the values of the neighboring pixels to the current block which are included in the blocks 2,4,5,7, respectively, as depicted in FIG. 4B. In case the side-matching function exceeds a predetermined threshold, the transmitted class name of the current block is determined as incorrect. The pixels of the current block and the neighboring blocks are retrieved from the image formatter 230 shown in FIG. 3.

The error detecting scheme for the current block 0 described above is summarily shown in FIG. 5. In step S1, the class name for the block 0 is read from the decoding circuit 210. If the current block belongs to an edged class, steps S11 through S14 are performed. Otherwise, steps S21 through S23 are executed.

In step S11, the reference blocks, i.e., the set S in Eq. (1) are selected from the eight neighboring blocks of the current block. The class names for the selected reference blocks are read in step S12. In step S13, the error detecting function of Eq. (1) is calculated using the class names obtained in step S12. If the error detecting function is larger than the threshold T(c(0)) predetermined according to the transmitted class name for the current block, the class name is determined to be incorrect due to, e.g., a transmission error.

Meanwhile, if the block 0 is not an edged class, the boundary pixels of the current block and the neighboring pixels of the reference blocks, i.e., blocks 2, 4, 5, 7, are read from the image formatter 230 in step S21. The side-matching function of Eq. (2) is calculated in step S22. If the side-matching function is larger than a predetermined threshold T', the class name for the current block is designated to be incorrect due to, e.g., a transmission error.

While the present invention has been described with respect to the particular embodiments and quantization scheme, it will be apparent to those skilled in the art that various changes and modifications may be made without departing from the spirit and scope of the invention as defined in the following claims.

What is claimed is:

1. A method for detecting an error in a class name of a current block for use in an image decoding system for decoding an image signal encoded by using a classified vector quantization method wherein an image frame of the image signal is divided into a multiplicity of blocks, each of said blocks being classified into one of (M+1) classes based on an edge pattern of said each of the blocks, said (M+1) classes including a non-edged class having no edge therein and M edged classes, each of the M edged classes having an edge therein with M being an integer greater than 1, and each of said (M+1) classes being given a class name, said method comprising the steps of:

decoding the image signal to provide a class name and a cordword index for each of the blocks;

generating a reconstructed block of pixel values for each of the blocks by dequantizing the cordword index through the use of a cordbook selected in response to the class name of said each of the blocks;

storing reconstructed blocks of pixel values to form a reconstructed image frame signal;

determining, based on a decoded class name of the current block, whether the current block belongs to one of the M edged classes or corresponds to the non-edged class and selecting reference blocks out of neighboring blocks of the current block; and if the current block belongs to one of the edged classes, determining the class error of the current block based on a degree of similarity between an edge pattern represented by the decoded class name of the current block and an edge pattern represented by a decoded class name of each of the selected reference blocks and if the current block corresponds to the non-edged class, obtaining, from the reconstructed image frame signal, boundary pixel values of the current block and their neighboring pixel values within the selected reference blocks to thereby determine the class error of the current block based on the obtained pixel values.

2. The method according to claim 1, further comprising the step of concealing determined class errors thereby improving an image quality of the reconstructed image frame signal.

* * * * *